US011969746B2

(12) United States Patent
Büstgens

(10) Patent No.: US 11,969,746 B2
(45) Date of Patent: Apr. 30, 2024

(54) COATING SURFACES BY A DOD APPLICATION METHOD

(71) Applicant: EXEL INDUSTRIES SA, Epernay (FR)

(72) Inventor: Burkhard Büstgens, Gundelfingen (DE)

(73) Assignee: EXEL INDUSTRIES SA, Epernay (FR)

( * ) Notice: Subject to any disclaimer, the term of this patent is extended or adjusted under 35 U.S.C. 154(b) by 391 days.

(21) Appl. No.: 15/867,399

(22) Filed: Jan. 10, 2018

(65) Prior Publication Data

US 2018/0133736 A1 May 17, 2018

Related U.S. Application Data

(63) Continuation of application No. 14/386,334, filed as application No. PCT/DE2013/000157 on Mar. 20, 2013, now abandoned.

(51) Int. Cl.

*B05B 12/04* (2006.01)
*B05B 1/16* (2006.01)
*B05B 12/12* (2006.01)
*B05B 12/14* (2006.01)
*B05B 13/00* (2006.01)
*B05B 13/04* (2006.01)
*B05C 5/02* (2006.01)

(Continued)

(52) U.S. Cl.

CPC ................ *B05B 12/04* (2013.01); *B05B 1/16* (2013.01); *B05B 1/169* (2013.01); *B05B 12/122* (2013.01); *B05B 12/126* (2013.01); *B05B 12/1409* (2013.01); *B05B 13/04* (2013.01); *B05C 5/02* (2013.01); *B05D 1/02* (2013.01); *B41J 2/01* (2013.01); *B05B 13/005* (2013.01)

(58) Field of Classification Search

CPC ........... B05B 12/04; B05B 1/16; B05B 1/169; B05B 12/122

See application file for complete search history.

(56) References Cited

U.S. PATENT DOCUMENTS 4,360,267 A * 11/1982 Nettesheim ........... G03F 7/2022 355/100
5,578,813 A * 11/1996 Allen ..................... H04N 1/047 250/556

(Continued)

OTHER PUBLICATIONS

"The ultimate guide for printhead technologies" Simon Eccles (Jan. 31, 2017) (https://www.fespa.com/en/news-media/features/the-ultimate-guide-for-printhead-technologies).*

*Primary Examiner* — Kevin R Kruer
(74) *Attorney, Agent, or Firm* — Lott & Fischer, PL

(57) ABSTRACT

Provided is a method of coating at least an area of a surface by a Drop-on-Demand (DOD) method, comprising the steps of providing a DOD dispensing head (1) with at least two individually controllable nozzles (2) arranged in a row, which is moved by a robotic device, applying a movement to the DOD dispensing head parallel while maintaining a distance between the nozzles (2) and the surface, wherein the movement comprises a rotation of the dispensing head around an axis perpendicular to the surface, dispensing discrete amounts of a the liquid coating material through the at least one nozzle onto the surface, wherein firing of the at least 2 nozzles is triggered non-synchronously by a control unit.

7 Claims, 4 Drawing Sheets

(51) Int. Cl.
*B05D 1/02* (2006.01)
*B41J 2/01* (2006.01)

(56) References Cited

U.S. PATENT DOCUMENTS 5,953,497 A * 9/1999 Kokubo ................. H04N 1/047 358/1.9
5,988,900 A * 11/1999 Bobry ........................ B41J 3/39 346/143
6,062,686 A * 5/2000 Kinoshita .................. B41J 3/36 347/109
6,318,832 B1 * 11/2001 Bates ..................... B41J 2/5056 347/15
6,648,468 B2 * 11/2003 Shinkoda ............... B41J 2/0057 347/103
6,846,119 B2 * 1/2005 Walling ..................... B41J 3/36 347/109
6,997,541 B2 * 2/2006 Edamura .............. B41J 2/04505 347/12
7,336,388 B2 * 2/2008 Breton ....................... B41J 3/36 347/109
8,196,787 B2 * 6/2012 Strandberg ................ A45F 5/00 2/16
8,240,801 B2 * 8/2012 Bledsoe ..................... B41J 3/36 347/109
8,351,062 B2 * 1/2013 Bledsoe ................. H04N 1/107 347/109
8,462,379 B1 * 6/2013 Simmons ................... B41J 3/36 358/1.18
8,613,491 B1 * 12/2013 Bledsoe ..................... B41J 3/36 347/14
8,705,117 B1 * 4/2014 McClelland ............. B41J 3/407 358/1.9
8,724,118 B1 * 5/2014 Burke .................. G01D 5/2457 356/614
9,205,671 B1 * 12/2015 Simmons .............. G06F 3/1292
9,294,649 B2 * 3/2016 Mealy .................... H04N 1/032
9,411,431 B2 * 8/2016 Simmons .............. G06F 3/0317
9,555,645 B1 * 1/2017 Mealy ........................ B41J 3/36
10,239,309 B2 * 3/2019 Park ..................... B41J 2/04508
10,458,938 B2 * 10/2019 Wold ................... G01N 27/048
2002/0070988 A1 * 6/2002 Desormeaux ........ B41J 2/16535 347/8
2002/0097291 A1 * 7/2002 Castelli .................... B41J 11/42 347/19
2004/0021912 A1 * 2/2004 Tecu ...................... H04N 1/107 358/473
2004/0046813 A1 * 3/2004 Edamura ................ B41J 2/0458 347/14
2005/0088683 A1 * 4/2005 Silverbrook ......... H04N 1/1074 358/1.15
2006/0061647 A1 * 3/2006 Breton ................ G06F 3/03544 347/109
2007/0120937 A1 * 5/2007 Ahne ......................... B41J 3/36 347/109
2007/0182805 A1 * 8/2007 Silverbrook ............... B41J 3/36 347/109
2007/0237560 A1 * 10/2007 Brown ....................... B41J 3/46 400/88
2007/0263063 A1 * 11/2007 Reed ...................... H04N 1/107 347/109
2007/0264069 A1 * 11/2007 Combs ....................... B41J 3/36 400/88
2008/0007762 A1 * 1/2008 Robertson .................. B41J 3/36 358/1.15
2008/0030534 A1 * 2/2008 Ahne ......................... B41J 3/36 347/11
2008/0075511 A1 * 3/2008 Reed ...................... H04N 1/107 400/88
2008/0075512 A1 * 3/2008 Gates ..................... H04N 1/107 400/88
2008/0144053 A1 * 6/2008 Gudan ....................... B41J 3/46 358/1.8
2008/0170900 A1 * 7/2008 James .................... B41J 2/1752 400/88
2009/0009812 A1 * 1/2009 Sirringhaus ............ B41J 2/2146 358/3.26
2009/0032560 A1 * 2/2009 Strandberg ................ A45F 3/14 224/267
2009/0109271 A1 * 4/2009 Studer ........................ B41J 3/36 347/109
2009/0160894 A1 * 6/2009 Barnard ..................... B41J 3/36 347/12
2009/0237482 A1 * 9/2009 Mealy ........................ B41J 3/36 347/109
2010/0183815 A1 * 7/2010 Marx ...................... B05B 13/04 427/421.1
2010/0245419 A1 * 9/2010 Grisolia ................. B41J 2/1753 347/9
2011/0002722 A1 * 1/2011 Hirata ................ G03G 15/6573 399/407
2011/0096340 A1 * 4/2011 Crucs ..................... H04N 1/107 358/1.6
2012/0219359 A1 * 8/2012 Baltus ................... E01C 23/163 404/93
2012/0242730 A1 * 9/2012 Leighton .................. B41J 3/543 347/14
2013/0038466 A1 * 2/2013 Shen ...................... G01D 4/002 340/870.02
2013/0099638 A1 * 4/2013 Pala ......................... B41J 29/13 312/223.2
2014/0011005 A1 * 1/2014 Koele ....................... B41J 19/16 428/196
2014/0209020 A1 * 7/2014 Burke .................. G05D 1/0225 118/712
2014/0285581 A1 * 9/2014 Drury .................. B41J 2/14209 347/68
2015/0086723 A1 * 3/2015 Bustgens ................ B05B 1/169 427/427.2
2016/0031209 A1 * 2/2016 Morizono ............ B41J 2/04586 347/9
2017/0291439 A1 * 10/2017 Koyata ..................... B64D 1/16
2018/0170071 A1 * 6/2018 Albert .................. H04N 1/1912
2019/0255551 A1 * 8/2019 Hargadon ........... B05B 13/0431
2022/0023144 A1 * 1/2022 Kostic ...................... A61G 1/01

* cited by examiner

COATING SURFACES BY A DOD APPLICATION METHOD

This application is a continuation of U.S. patent application Ser. No. 14/386,334, filed on Sep. 18, 2014, which is a national phase of PCT Application No. PCT/DE2013/000157 filed Mar. 20, 2013, the contents of which are hereby incorporated by reference.

The invention relates to the field of the coating of surfaces, especially of large areas with viscous coating materials in the construction sector and the industrial sector. As coating materials are understood, for example, architectural paints for indoor and outdoor use, industrial coatings and functional coatings. The layer thicknesses are typically from 20 to 150 micrometers.

The aforementioned coatings are now applied manually by brush, roller or spray equipment. The procedures have low productivity, produce non-uniform layer thicknesses and require, in particular in the case of splashing due to the strong "overspray" extensive preparations to protect the area from paint mist or paint splatters.

U.S. Pat. No. 7,981,462B2 describes a method for printing on building surfaces with graphical content with a manual paint applicator. This is arbitrarily moved over the surface. The position of the inking unit is continuously measured with a position measuring system which must be installed before starting work. Since the state of work of any pixel is stored permanently, a database is created, based on which it can be decided whether the pixel still needs to be printed, or whether it has already been printed. Thus, the paint output of a pressure nozzle is always prohibited when the pixel corresponding to the position of the nozzle has already been stored as "done". This is to prevent a double-printing. If merely a coating without graphical content has to be applied, the installation of a position measurement system, the position measurement, a real-time image processing and a printing head control based on this is too expensive.

The object of the invention is to provide a method and an apparatus for applying in a simple and practical manner viscous coating materials by using a printing method.

The object is solved by the invention as follows: On a surface a homogeneous layer of a viscous coating material is applied by means of a movable coating device, by the movable applicator is brought into contact with the surface by means of rollers 3 or by sliding members, and, is moved by a motor or manually with a handle 10 mainly in a main movement direction 6. Drop-on-demand printing nozzles arranged in one or more rows apply the coating material as dots or spray dots on the surface of such a way that the dots or spray dots overlap. The output frequency of a respective drop-pressure nozzle 2 is variable and is determined depending on their movement speed.

The method according to the invention on the one hand provides for a high working speed of more than 1 m/s without spray or splash. On the other hand it also allows printing with extremely slow feed rate to precisely draw by hand limitations of paint regions and edges, at an always constant layer thickness. A single swath provides a closed layer with reproducible layer thickness independent of the operating speed. Because of the drop-on-demand printing technology there is no overspray. Very homogeneous and thin coatings can be achieved by application of spray dots instead of drops. Since the paint can be kept in a closed system, further the overall operation is very clean and no work preparations to protect the environment against pollution with paint have to be conducted.

The invention is based on a printing method (1) DE102009029946A1, the content of which is hereby incorporated by reference in this application. The working principle of the micro-pneumatically printing nozzles 2 according to (1) allows printing higher viscous and particle-loaded coating materials by adopting the contactless drop-on-demand (DOD)-method. As a DOD method it is understood the discontinuous discharge of discrete drops or discrete droplet mist from a pressure nozzle 2, wherein free-flying liquid impacts on the surface to be coated, and thus produces an imprinted dot 9. A plurality of nozzles is arranged linearly in a line or in an array out of multiple lines. The following the terms drops, droplets or droplet cloud are used synonymously and refer to a single liquid discharge of a pressure nozzle 2 due to a control signal.

Figure 1A:
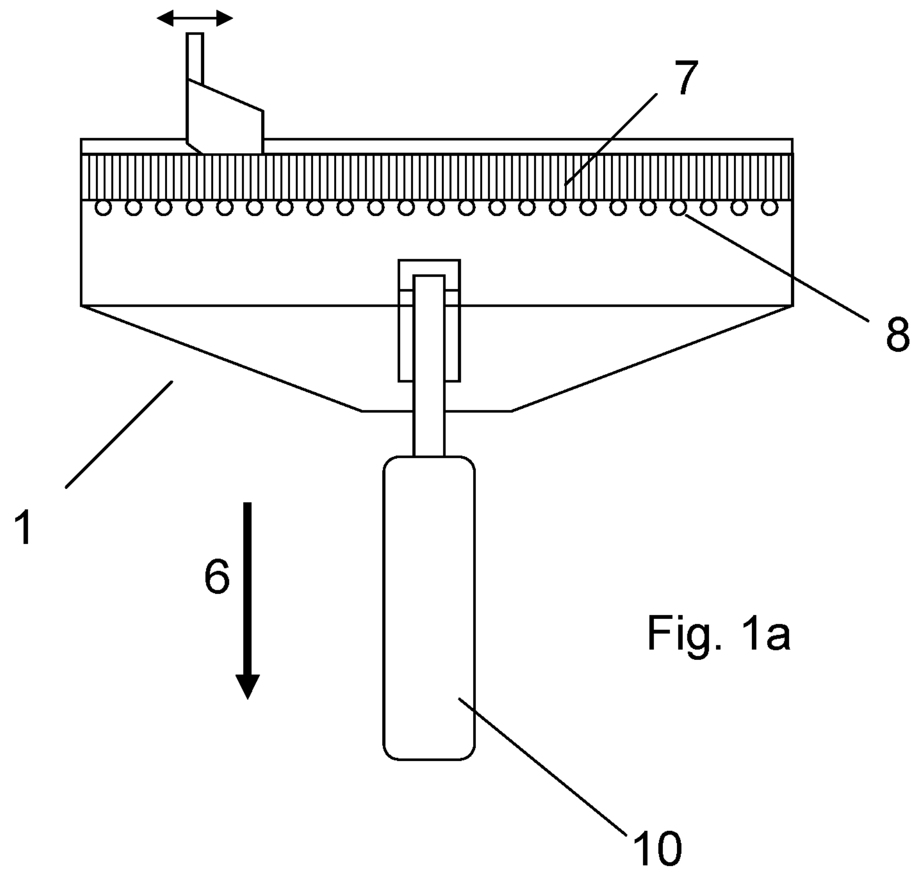
FIGS. 1 *a* to *b* show a top view and side view of a manual printing device.
Figure 1B:
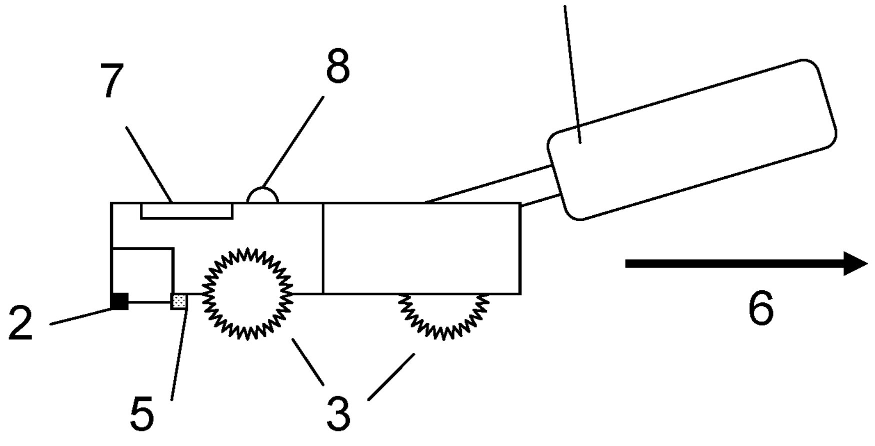
Figure 2A:
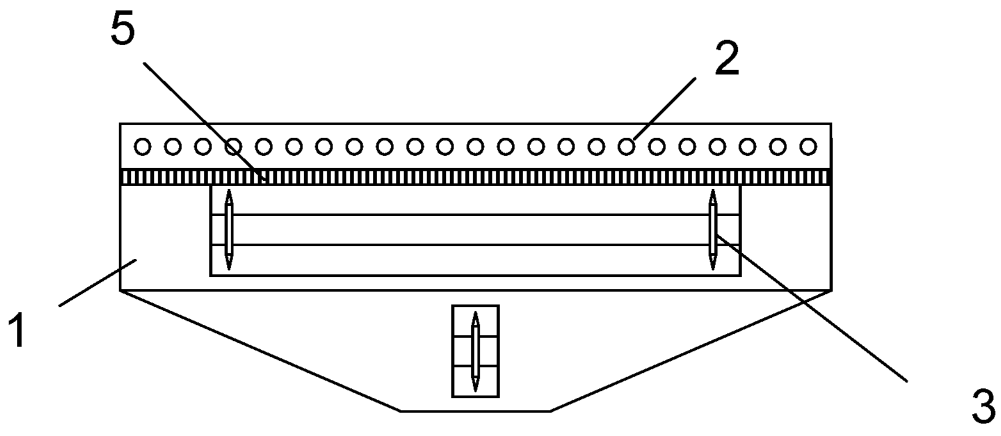
FIGS. 2 *a* to *c* show different types of wheel systems.
Figure 2B:
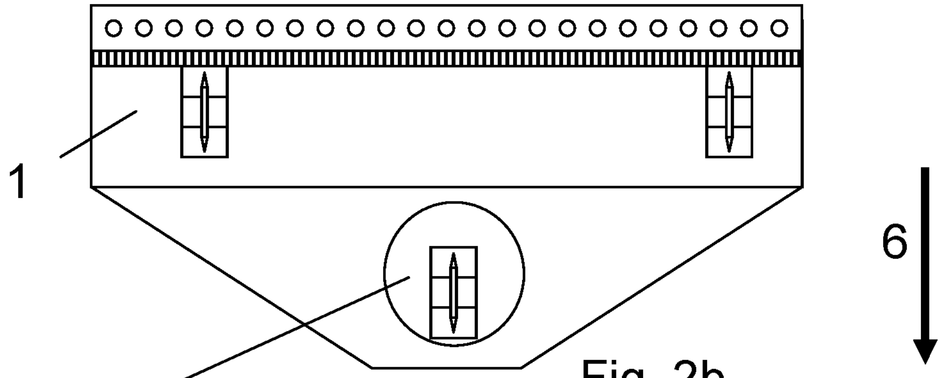
Figure 2C:
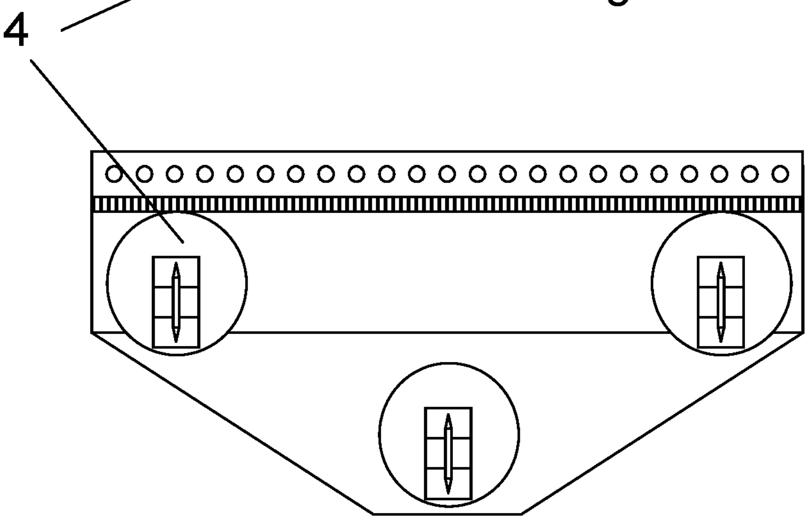

The invention proposes a portable, manually or motor-driven application device 1, see FIGS. 1*a, b*, which is moved on a surface freely or on a predetermined route. A manual application device 1 is preferably moved freely on a surface, has a handle 10 like a paint roller and will be handled in a similar way. Also, the handle 10 can be connected to the application device 1 via an optional extension and a rotationally rigid, but flexible joint such as a Kardan joint. The applicator apparatus 1 runs on wheels 3 or sliding elements on the surface. Wheels 3 and slide elements can be used in any configuration and composition so that a certain drive property is achieved: Linear movements, curved movements along the main direction of movement, oblique or lateral movements. Wheels 3 and sliders further ensure a constant nozzle distance to the surface. To also process well on undried coating materials, wheels 3 may be formed so that they are in contact with the surface only by tips or teeth distributed in the circumference, as in case of narrow gear wheels, see FIG. 1*b*. A hydrophobic coating of the wheels 3 and tips is advantageous. Preferably two wheels are mounted in a distance of a few centimetres in the forward direction of the line of printing nozzles 2, one or more other in a greater distance. The motion may be supported by motorized or robotic devices or carried out autonomously.

The invention is based on the thought that a row of regularly spaced drop-on-demand printing nozzles 2 are moved preferably perpendicular to the row on a surface to be coated. This preferred direction is in the following referred to as the main direction of movement 6. In dependence of the measured and/or calculated motion of each printing nozzle 2 printing dots 9 are applied by them point by point preferably with an equidistant spacing D (see FIG. 3). By this print dots 9 are placed as narrow to each other, that adjacent print dots 9 overlap and merge with each other. Print dots 9 can be applied as discrete droplets or as droplet clouds or in other words as a mist of droplets. The discharge frequency of a printing nozzle 2 is proportional to their movement speed and inversely proportional to the diameter of the print dot 9. The distance between adjacent printing nozzles 2 is also smaller than the diameter of the resulting print dots 9. It is the goal to achieve a homogeneous and closed coating layer. The size of the liquid droplets, the discharge speed of the droplet from the printing nozzle, the rheology of the coating material as well as the wetting properties of the coating material to the substrate determine whether the coating layer is sufficiently closed and homogenous.

The control of the printing nozzles 2 of the array is done by an embedded system, e.g. by use of a microcontroller or FPGA. To obtain a homogeneous coating with uniform thickness, it is the objective of the control unit to actuate the individual printing nozzles 2 thus, that the mean output of the coating material per surface unit is constant or is within a tolerance range. The output of the coating material is the product of the drop volume and number of drops.

A movement, herein understood as a "change of position over time" can be measured with odometric methods, for example, by measuring a covered distance by using incremental or absolute measuring sensors by measuring the rotation of wheels 3, by optical sensors which measure their relative change of position with respect to the substrate, by speed measurements at one or more points of the application device 1, by measuring a speed and a rotational speed of the application device 1, or by analyzing a predetermined and tracked path. Within this specification, the term velocity measurement is to be considered interchangeable with "time interval measurements of fixed displacements" or "displacement measurements at fixed time intervals."

In a first variant, the application device 1 shall be moved on a straight path. This movement can be achieved by way of two wheels 3, which are aligned in parallel and comprise the same rolling speed. The direction of travel is preferably the main direction of movement 6. Embodiments thereof are juxtaposed wheels 3, connected by a rigid axle or synchronously driven wheels 3. All printing nozzles 2 comprise the same speed at all times and therefore can be actuated synchronously. So the distance D between successively printed dots 9 of all of the printing nozzles is constant, see FIG. 3. This mode of operation is advantageous if rectilinear borders of a coating layer have to be drawn precisely but without further aids.

Figure 3:
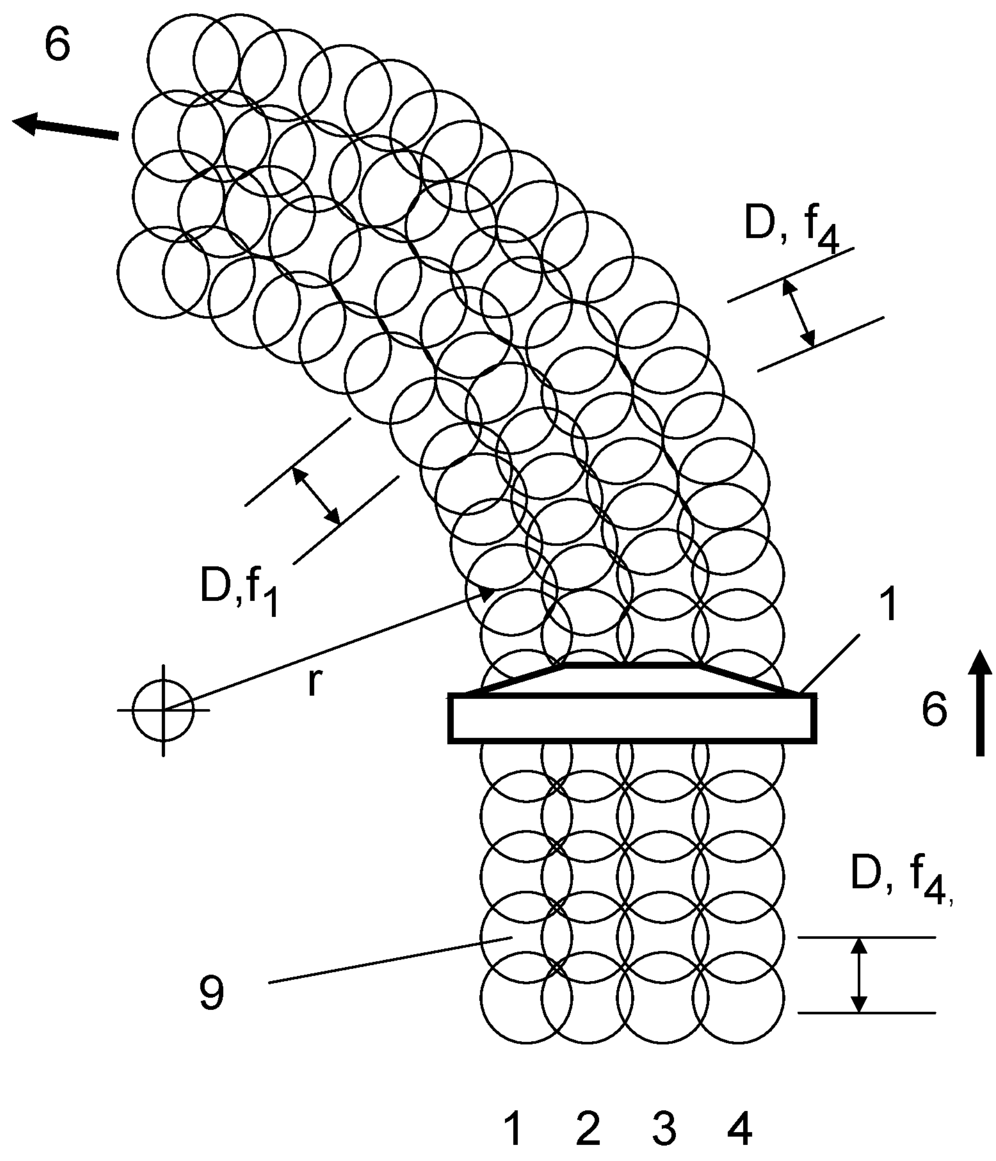
FIG. 3 illustrates schematically the arrangement of printing- or spray-dots 9 in case of a straight and a curved path.

If the rollers 3 are not coupled with each other, they allow for circular or curved motion by still preventing sideways movements. FIG. 3 illustrates this case: In a left turn, which is a superposition of a forward and rotary movement, nozzle 4 has to cover a longer track than the nozzle 1. The distance between the successively discharged points of each print nozzle remains D. The printing nozzles are thus not driven synchronously, nozzle 1 has a lower firing frequency than nozzle 4. In case of a small forward but a large rotational velocity component, negative velocities occur at a number of nozzles. In this case, these respective printing nozzles 2 are not actuated. Circular and curved movements require to measure and/or calculate the rotation of the application device 1, for example by measuring the speeds of the two wheels 3, or by measuring a velocity in a forward direction and a rotational speed with a rotational speed sensor.

Figure 4:
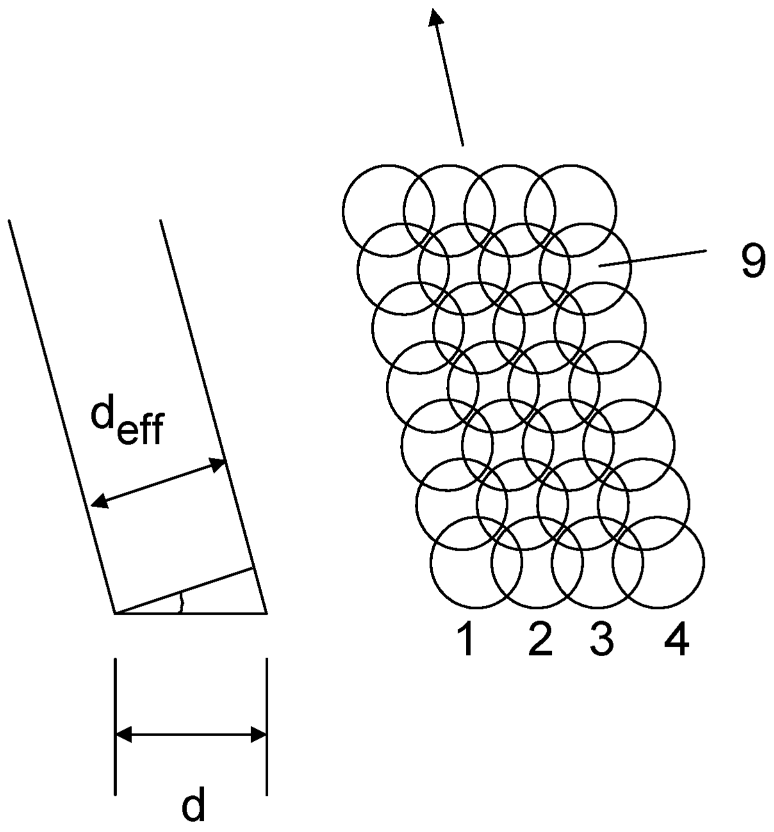
FIG. 4 shows the scenario in case of a direction of movement deviating from the main direction of movement 6.

Arbitrary movements, including lateral movements, can be realized when using swivelling rollers 4, ball casters or sliding elements. Thus, if the application device 1 is embodied as handheld application device 1, it can be moved in serpentines over the surface thus keeping it in permanent contact, similar as it is done by a "puller" when cleaning floors and windows. Since the freehand drawing of straight lines with this method is difficult due to a missing lateral guide, the swivelling bearings of the swivelling rollers 3 may be locked temporarily. Lateral movements result in an effectively smaller-point distance $d_{eff}$ in the direction of movement 6 in comparison to the printing nozzle distance D, see FIG. 4. To obtain the postulated constant product out of the number of printed dots times the volume per dot dots it can be fired with a lower frequency. But this is feasible only in case of a small lateral movement component. In case of a larger lateral movement component the overlap of two points in the direction perpendicular to the main movement direction would be too large and so would have to be compensated by extremely large distances between dots in the main direction in order to prohibit a locally too high application of paint. Therefore, the liquid volume of the liquid discharged per dot must be reduced and at the same time the firing frequency has to be increased such, that the product of printed dots times the volume per dot will be correct again per surface unit.

To facilitate printing of outer edges, all embodiments mentioned before may comprise movable and lockable stops 11 as shown in FIG. 1*a*. Straight or curved lines or paint edges can also be drawn by using a ruler or contour rail which is attached to or manually pressed on the surface with a first hand, while the application device is moved along a side face or side guide of the ruler with the second hand.

The rotation of the wheels 3 can be damped by use of passive and/or active damping methods to obtain continuous acceleration profiles, or to obtain a speed-dependent resistance to movement, and to prevent the operator of a manual application device for example to exceed of a maximum speed, by providing a defined manual feeling. Passive damping systems may include for example liquid bearings with linear viscous or with shear rate progressively viscous liquids for the wheels 3, or flywheel mass systems with gear transmissions, active damping methods may include servomotors that are actively controlled or generators with a speed-dependent load.

In many cases it is not required the entire print width, as is results from the number of print nozzles located in a row 2. For this purpose a part of the printing nozzles 2 are disabled. The deactivation can be done by human interface devices like linear or rotary switches, touch screens or tactile sensors. The active printing nozzles 2 can be identified optically for example by LEDs 8 in the switched-on state.

Opaque coating materials can be applied in overlapping swaths. In the region of overlap by this the double layer thickness is obtained. Depending on the application, e.g. in the field of the facade coating this layer thickness variation is tolerable.

On surfaces with small roughness or in the case of large layer thicknesses, the overlap regions are possibly visible so that a solution is needed to prevent a double printing. The solutions are based on the approach, that it is optically detected, whether a coating material at the position of one or more printing nozzles 2 already exists on the surface. In this case, the respective pressure nozzle is deactivated at this position. In order to produce a strong optical contrast to the substrate, an additive can be added to the coating material, which is phosphorescent or the colour of which is outside of the visible light. Detection can be done by means of optical sensors such as photodiode arrays or a cheap, wide CCD line 5, as used in image scanners. The latter can be mounted at the bottom, located in direction of movement 6 before the printing nozzles 2 array. Optical filters can be used to obtain a matched selectivity with respect to the light emission or reflection of the additives as mentioned above. So, if a CCD element of the CCD line 5 has detected an existing paint layer, the printing nozzle, which can be assigned to it by considering the direction of movement 6, is deactivated.

The use of the application device 1 according to the invention allows the mobile coating of surfaces without any preparatory activities at the surfaces. The fluids including the coating material can be supplied under pressure completely within in closed systems, so that the risk to contaminate the environment with coating materials is minimized. Different components are required for operation of the application device, which are part of a set. The manual application device 1 may contain the following components: A series of micro-pneumatic actuated printing nozzles 2 to which the coating material is supplied under pressure and with a distance d to each other such, that the spray patterns of adjacent print nozzles overlap at least partial; a manually or automatically actuated covering member for the print nozzles 2 to prevent rapid drying in of coating material; a CCD line sensor 5 for detecting already printed areas; user input elements for play/pause/stop and selection of the active printing nozzle 2, enabling detection of already coated areas; locking member for axes; a rinsing circuit with rinsing liquid, a feed reservoir and a waste reservoir, to clean the ink nozzle 2; a peripheral reservoir for the coating material or cartridges containing coating material, a circulation system for the coating material, and means for generating pressure.

The use of the application device 1 according to the invention further allows the processing of multi-component materials which are brought together point wise at the place of application or directly on the surface. In this way, highly reactive 2-component materials can be applied to for a coating by use of a mobile device. For this purpose at least 2 rows of pneumatically driven printing nozzles 2 must be realized, whereas their outlets are appropriately arranged so, that the ejected coating material components get into contact with each other on the way to the surface or on directly.

The invention claimed is:

1. A method for coating at least an area of a surface by a Drop-on-Demand (DOD) method with a liquid coating material, comprising the steps of:

providing a DOD dispensing head with a plurality of nozzles arranged in a line forming a row of nozzles, each of the nozzles being individually controllable to dispense the liquid coating material;

moving the DOD dispensing head along a path over the surface, the path maintaining a constant distance between the plurality of nozzles and the surface;

wherein upon moving the DOD dispensing head, the line forming the row of nozzles is maintained oblique to the path;

dispensing discrete amounts of the liquid coating material onto the surface through one or more of the nozzles, wherein the dispensing is triggered non-synchronously by a control unit;

wherein one or more of the plurality of nozzles is actuated at a firing frequency that is independent of the firing frequency of one or more of the other nozzles in the plurality of nozzles; and wherein the firing frequency of at least one of the plurality of nozzles is based on a speed of the nozzle relative to the surface such that a distance between centers of drops of the liquid coating material successively dispensed by the nozzle is constant.

2. A method for coating at least an area of a surface by a Drop-on-Demand (DOD) method with a liquid coating material, comprising the steps of:

providing a DOD dispensing head with a plurality of nozzles arranged in a line forming a row of nozzles, each of the nozzles being individually controllable to dispense the liquid coating material;

moving the DOD dispensing head along a path over the surface, the path maintaining a constant distance between the plurality of nozzles and the surface;

wherein the path is substantially perpendicular to the line of nozzles;

wherein moving the DOD dispensing head comprises a superposition of a linear movement along the path and a rotational movement with an axis of rotation being perpendicular to the surface;

dispensing discrete amounts of the liquid coating material onto the surface through one or more of the nozzles, wherein the dispensing is triggered non-synchronously by a control unit;

wherein one or more of the plurality of nozzles is actuated at a firing frequency that is independent of the firing frequency of one or more of the other nozzles in the plurality of nozzles; and wherein the firing frequency of at least one of the plurality of nozzles is based on a speed of the nozzle relative to the surface such that a distance between centers of drops of the liquid coating material successively dispensed by the nozzle is constant.

3. The method according to claim 2, wherein the rotational movement maintains the line forming the row of nozzles substantially perpendicular to the path.

4. The method according to claim 2, wherein successive drops of the liquid coating material dispensed by at least one of the plurality of nozzles overlap on the surface.

5. The method according to claim 2, wherein the speed of the nozzle relative to the surface is determined by measuring a speed of at least one point of the DOD dispensing head relative to the surface.

6. The method according to claim 2, wherein the movement speed of the at least one of the plurality of nozzles relative to the surface is determined by measuring the rotational velocity of the rotational movement of the DOD dispensing head around its axis of rotation.

7. The method according to claim 2, wherein each nozzle in the plurality of nozzles is actuated to dispense the liquid coating material depending on a speed of such nozzle relative to the surface.

* * * * *